(12) United States Patent
Chen et al.

(10) Patent No.: US 7,353,100 B2
(45) Date of Patent: Apr. 1, 2008

(54) METHOD FOR EFFECTING KICKDOWN SHIFT

(75) Inventors: Gang Chen, Rochester Hills, MI (US); Aaron Pfadt, Salt Lake City, UT (US)

(73) Assignee: Chrysler LLC, Auburn Hills, MI (US)

( * ) Notice: Subject to any disclaimer, the term of this patent is extended or adjusted under 35 U.S.C. 154(b) by 349 days.

(21) Appl. No.: 11/147,534

(22) Filed: Jun. 8, 2005

(65) Prior Publication Data

US 2006/0282206 A1 Dec. 14, 2006

(51) Int. Cl.
*G06F 19/00* (2006.01)
(52) U.S. Cl. .......................................... 701/51; 477/133
(58) Field of Classification Search ...................... None
See application file for complete search history.

(56) References Cited

U.S. PATENT DOCUMENTS

| | | | |
|---|---|---|---|
| 4,905,545 A | * | 3/1990 | Leising et al. .............. 477/133 |
| 4,951,200 A | | 8/1990 | Leising et al. |
| 5,848,951 A | * | 12/1998 | Lee ............................. 477/133 |
| 6,978,201 B1 | * | 12/2005 | Chen et al. .................... 701/51 |

* cited by examiner

*Primary Examiner*—Michael J. Zanelli
(74) *Attorney, Agent, or Firm*—Ralph E. Smith

(57) ABSTRACT

A method for effecting a kickdown shift in a transmission of an automotive vehicle controls turbine speed change based on a continuous desired acceleration calculation. The method determines an initial speed of a turbine that transmits torque between an engine and a plurality of gears through a plurality of releasing and engaging elements. A target speed of one of the plurality of gears is determined. A desired time required to increase the turbine speed to the target speed is determined. A desired acceleration of the turbine is calculated according to the initial speed, the target speed, and the desired time. Turbine speed change rate is controlled through controlling the clutch torque of one or more of the releasing and engaging elements based on the desired acceleration.

18 Claims, 2 Drawing Sheets

METHOD FOR EFFECTING KICKDOWN SHIFT

FIELD OF THE INVENTION

The present invention relates to automotive transmissions, and more particularly to controlling kickdown shifts in automotive transmissions based on speed and desired acceleration.

BACKGROUND OF THE INVENTION

Due to relatively high instances of system inertia and delay in automotive transmissions, using exclusively feedback control of various components in automotive transmissions may not be sufficient for certain transient maneuvers, especially for systems with large accumulators. Control of transmission turbine speed during a kickdown shift is one example of a transient condition in automotive transmissions. During a kickdown shift, such as a drop from $4^{th}$ gear to $3^{rd}$ gear, or from $3^{rd}$ gear to $2^{nd}$ gear, the speed of the turbine must increase to correspond to a targeted gear ratio. Accordingly, the acceleration of the turbine must be controlled to correspond to a targeted acceleration based on current gear and vehicle speed acceleration. In such transient cases, feedforward control may be used to anticipate system changes. For example, mixed feedforward and feedback control can be used for a smooth kickdown shift without causing significant "feel" issues for the driver, thereby improving overall shift quality. Shift quality has been shown to be an important factor for driver satisfaction.

During kickdown shifts, the engine output speed increases, thereby increasing torque converter slip and torque output. Vehicle speed and throttle position trigger a downshift schedule, and a kickdown shift is initiated. One current transmission control method 10 effects a kickdown shift by dumping clutch element pressure until slip occurs as shown in FIG. 1. The engine output speed increases, thereby increasing torque converter slip and torque output, while release element pressure continues to fall. Therefore, when slip occurs, a release element controlled speed phase 12 begins, and proportional control is used on the release element to limit the rate of turbine speed increase, or turbine acceleration 14.

The input torque is primarily used to accelerate the engine, the torque converter, and the turbine during the release element controlled speed phase 12. After the release element controlled speed phase 12, the targeted turbine acceleration 14 is reduced by a step change, and the speed of the engine is decreased in such a manner that when $N_t$, or current turbine speed 16, passes through $N_j$, or target gear speed 17, the resulting overspeed and/or runaway is minimized. The phase 18 in which this activity occurs is referred to as "feather control." After the feather control phase 18 is complete, the control method 10 attempts to limit the current turbine speed 16 to a relatively small value, such as 50 rpm, above the target gear speed 17 during a second release element controlled speed phase 19, and the turbine acceleration 14 continues to decrease incrementally. Additionally, an apply element fill event is timed to occur a short time before the current turbine speed 16 reaches the targeted gear speed 17. For example, the apply element fill event may be timed to occur 100 ms before the current turbine speed 16 reaches the targeted gear speed 17. The apply clutch will be filled to a maximum pressure when the turbine speed 16 reaches within a trigger limit of the targeted gear speed 17.

However, the transmission control method 10 may not function as described above in actual practice. For example, the current turbine speed 16 may overshoot the target gear speed 17, or exceed the control capabilities of the transmission control method 10, during a kickdown shift. Because the turbine and associated planetary gear sets have inertia, and the hydraulic control system experiences system delay, any significant change in desired acceleration may cause temporary loss of control and/or unstable control dynamics. Additionally, turbine speed changes between gears can be substantially different at different gears or different vehicle speeds. Therefore, it is desirable to provide optimized control during a kickdown shift to further improve shift quality. A continuous variable and speed-based desired acceleration method to provide consistent and accurate transmission control during a kickdown shift is proposed.

SUMMARY OF THE INVENTION

A method for effecting a kickdown shift in a transmission of an automotive vehicle is described. The transmission includes a plurality of gears and a torque converter assembly and turbine for transmitting torque between an engine and the plurality of gears through a plurality of engagement elements. The method comprises determining an initial speed of the turbine. A target speed of one of the plurality of gears is determined. A desired time to increase the initial speed to the target speed is determined. A desired acceleration of the turbine is calculated according to the initial speed, the target speed, and the desired time. Torque of one or more engagement elements is controlled based on the desired acceleration.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
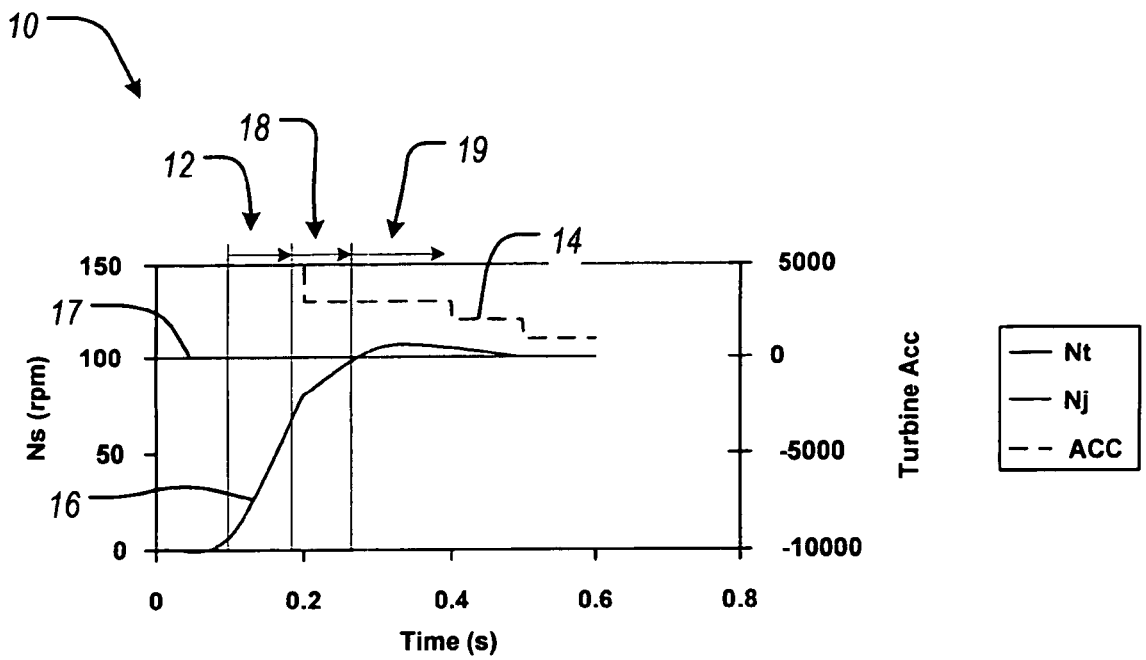
FIG. 1 illustrates a kickdown shift according to the prior art.
Figure 2:
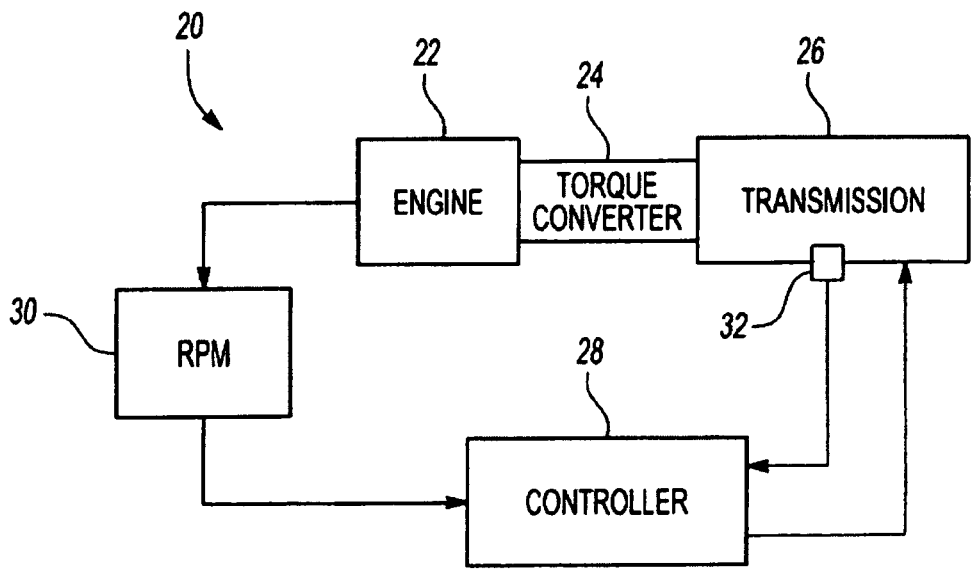
FIG. 2 is a functional block diagram of a transmission control system according to the present invention.

The present invention uses a model-based approach to identify speed and torque dynamics for each transmission element during transmission shift operations. Referring now to FIG. 2, a transmission control system 20 includes an engine 22, a torque converter 24, an automatic transmission 26, and a controller 28. The engine 22 drives the automatic transmission 26 through the torque converter 24. The transmission 26 drives a vehicle through a gear ratio. The controller 28 communicates with various sensors and controls transmission shifting. For example, an engine speed sensor 30 generates an engine speed signal. An accumulator 32 fills with oil, varying the volume of the accumulator 32, which changes clutch pressure. The controller 28 determines torque of the transmission element clutches according to engine speed, and additional factors of the torque converter 24 and the transmission 26, such as torque converter transferred torque, inertia for the engaged elements of the transmission 26, and desired turbine acceleration. The controller 28 further calculates a duty cycle for the PWM solenoids, which controls the flow rate to the currently shifting clutch element in the transmission 26 based on a relationship between each individual element clutch torque and pressure.

Figure 3:
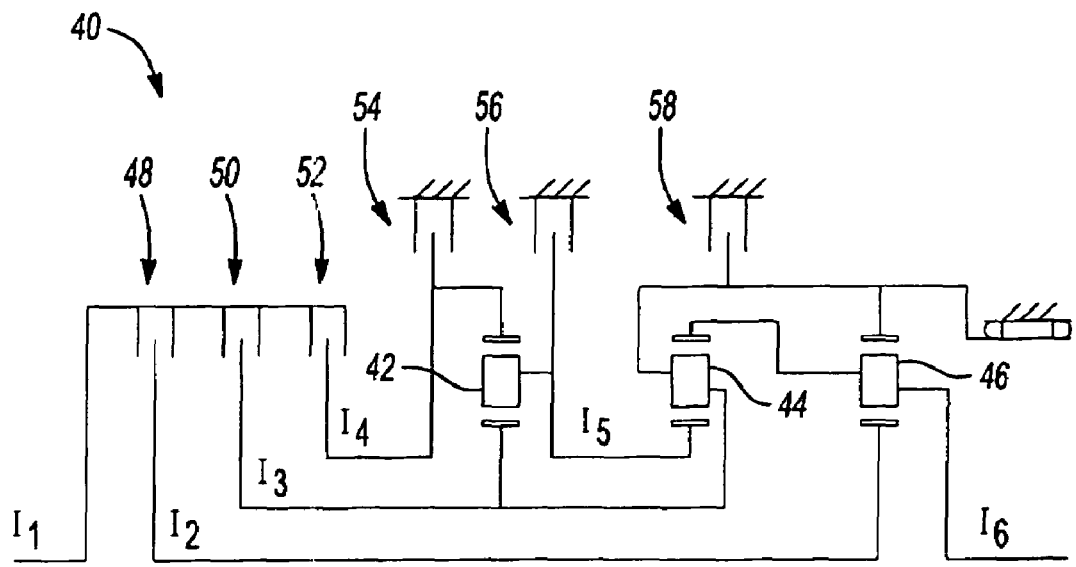
FIG. 3 illustrates a vehicle transmission according to the present invention.

Kickdown shifts are controlled based on target volume control and continuous variable, speed based desired acceleration. Referring now to FIG. 3, an exemplary automotive transmission 40 includes planetary gears 42, 44, and 46, rotating clutches 48, 50, and 52, and ground clutches 54, 56, and 58. Two or more of the clutches interact with one or more of the planetary gears in order to select a gear ratio of the transmission 40. The interaction of the clutches with the planetary gears defines clutch elements, which are identified schematically with inertias $I_1$ through $I_6$. For example, when clutches 54 and 56 are engaged, 4th gear is selected. However, in order to select 3rd gear, clutches 48 and 56 must be engaged. Therefore, in order for the transmission 40 to downshift from 4th gear to 3rd gear, clutch 54 must be released and clutch 48 must be applied. In any particular downshift, the element clutches that are releasing are referred to as "release element clutches." Conversely, element clutches that are applied during a downshift are referred to as "apply element clutches."

During the inertia phase of a kickdown shift, the torque required for releasing an element clutch is determined. For example, for a 4-3 kickdown shift (from 4th gear to 3rd gear), the torque for release element clutch 54 is:

$$T_{4c} = \frac{1}{4}[T_t - 3T_{ud} - \qquad \text{(Equation 1)}$$
$$(I_1 + 4I_2 + I_3 + 16I_4 + 9I_5)\alpha_t + (6I_2 + 12I_4 + 6I_5)\alpha_o]$$

where $T_{4C}$ is the torque at the release element clutch 54, $T_t$ is turbine output torque, $T_{ud}$ is torque at element clutch 48, $\alpha_t$ is turbine acceleration, $\alpha_o$ is output vehicle acceleration, and $I_1$ through $I_5$ are the inertias of various transmission elements during a 4-3 kickdown shift as shown in FIG. 3. Hereinafter, all references to the release clutch refer to clutch 54 with respect to a 4-3 kickdown shift wherein the clutch 54 is the release element clutch and clutch 48 is the apply element clutch. Although the following equations refer to a 4-3 kickdown shift, it should be understood that analogous calculations can be applied to other kickdown shifts.

During a kickdown shift, control of turbine acceleration ensures a smooth shift. The present invention determines transmission control based in part on current turbine speed, target turbine speed, and acceleration rate of change. Any significant change in desired acceleration requires a substantial clutch torque adjustment, further resulting in turbine speed oscillations. In order to provide an optimized control during kickdown shifts, a continuous variable and speed-based desired acceleration is proposed according to a desired acceleration equation:

$$\alpha_d = -\frac{N_j - N_{ti} + \Delta N}{\tau_2 \left(1 - e^{\frac{-\tau_1}{\tau_2}}\right)} e^{\frac{-\tau_1}{\tau_2}}, \qquad \text{(Equation 2)}$$

wherein $\alpha_d$ is the desired acceleration of the turbine, $N_j$, $N_{ti}$, and $\Delta N$ are target gear speed, initial turbine speed, and a small delta rpm, respectively, $\tau_1$ is a desired time for the turbine to travel from the initial speed to the desired speed, and $\tau_2$ is the decay rate of the desired acceleration. The desired acceleration equation generally consists of a speed based initial acceleration term and an acceleration change rate term. The speed based initial acceleration term includes both the initial turbine speed $N_{ti}$ and the targeted gear speed $N_j$. The desired acceleration equation results in a different initial acceleration based on the initial turbine speed $N_{ti}$ and the targeted gear speed $N_j$.

The acceleration rate change term provides a predetermined time from the initial turbine speed to the targeted gear speed. Additionally, including the acceleration rate change term results in a relatively smooth speed change rate with a continuous acceleration rate change. Since desired acceleration is directly associated with clutch control torque according to Equation 1, a very small and gradual change of acceleration results in a quasi-steady state, improving the quality and control ability of the feedback control.

Equation 2 is derived from an exponential decay rate $$\alpha_d = A \frac{N_j - N_{ti}}{\tau_1} e^{\frac{-t}{\tau_2}},$$

where A is a constant. Desired acceleration must meet the following condition:

$$N_j - N_{ti} = \int_0^{\tau_1} \alpha_d \, dt = \int_0^{\tau_1} A \frac{N_j - N_{ti}}{\tau_1} e^{\frac{t}{\tau_2}} \, dt = A \frac{N_j - N_{ti}}{\tau_1} \tau_2 \left(1 - e^{-\frac{\tau_1}{\tau_2}}\right).$$

From the above equation, the constant A can be expressed as:

$$A = \frac{\tau_1}{\tau_2 \left(1 - e^{-\frac{\tau_1}{\tau_2}}\right)}$$

In order to guarantee that the turbine speed is controlled to slightly above the targeted gear speed, a small delta rpm $\Delta N$ is added to the targeted gear speed, $N_j$, resulting in the final continuous desired acceleration expressed in Equation 2.

Generally, transmission input torque increases during kickdown shifts. Due to significant system inertia and delay, feedback control is not sufficient for the transient control of a transmission control system. During a kickdown shift, the turbine speed must be increased to a targeted gear ratio, and is also required to accelerate according to a targeted acceleration based on current vehicle acceleration. Therefore, turbine speed control during a kickdown shift is a transient condition. For smoother shifts, a mixed feedforward and feedback control method can be used.

Referring again to Equation 1, because $\alpha_o$ is much smaller than turbine acceleration due to significant vehicle inertia, output inertia force $(6I_2+12I_4+6I_5)\alpha_o$ and the torque at element clutch 48 can be removed, resulting in:

$$T_{4c} = \frac{1}{4}[T_t - (I_1 + 4I_2 + I_3 + 16I_4 + 9I_5)\alpha_t] \quad \text{(Equation 3)}$$

Equation 3 is the torque required to achieve a desired acceleration of $\alpha_t$. When the clutch capacity of clutch 54 is less than the required torque, turbine speed increases. The acceleration of the turbine speed rising depends on the input torque and the control torque in clutch 54. For feedback control, the torque change required for the acceleration change can be estimated by using the derivative of Equation 3:

$$\frac{dT_{4C}}{dt} = \frac{1}{4}\left[\frac{dT_t}{dt} - (I_1 + 4I_2 + I_3 + 16I_4 + 9I_5)\frac{d\alpha_t}{dt}\right],$$

which can be further discretized into:

$$\frac{T_{4C}^{des} - T_{4C}^C}{\Delta t} = \frac{1}{4}\left[\frac{T_t^i - T_t^{i-1}}{\Delta t} + (I_1 + 4I_2 + I_3 + 16I_4 + 9I_5)\frac{\alpha_t - \alpha_{dt}}{\Delta t}\right]$$

However, torque is not the actual control actuator in the preferred embodiment. Instead, the duty cycle of the solenoid is the control force used to change the torque in the element clutches. Therefore, the relationship between clutch torque and the duty cycle of the solenoid must be determined. The relationship between clutch torque and the duty cycle of the solenoid is based in part on a relationship between accumulator pressure and the flow rate:

$$Q_{DC} = \frac{dV_a}{dt} = \frac{A_a}{K_a}\frac{dP_{4C}}{dt},$$

where $Q_{DC}$ is the transmission control oil flow rate through the solenoid, $V_a$ is accumulator volume, $A_a$ is accumulator piston area, $K_a$ is the accumulator spring coefficient, and $P_{4C}$ is the clutch pressure. In a pulse width modulated solenoid system, the indication of clutch torque is accumulator volume. According to the relationship between the accumulator volume and the clutch pressure, the torque on clutch 54 can be calculated by:

$T_{4C} = P_{4C}A_p\mu_f R_{eff}n_{4C}$, where $P_{4C}$ is the clutch pressure of clutch 54, $A_p$ is the friction material area, $\mu_f$ is the coefficient of friction, $R_{eff}$ is the effective radial, and $n_{4C}$ is the number of friction surfaces. Subsequently, $$P_{4C} = \frac{1}{4\mu_f A_p R_{eff} n_{4C}}[T_t - (I_1 + 4I_2 + I_3 + 16I_4 + 9I_5)\alpha_t] \quad \text{(Equation 4)}$$

The relationship between the accumulator volume and the clutch pressure is expressed as:

$$V_{4C} = \quad \text{(Equation 5)}$$
$$\frac{A_A}{K_A}\left\{\frac{1}{4\mu_f}[T_t - (I_1 + 4I_2 + I_3 + 16I_4 + 9I_5)dt] - P_{pre}\right\} + V_{Amin}$$

and $$V_A = \frac{A_A}{K_A}[P_A - P_{pre}] + V_{Amin},$$

where $V_A$ is current accumulator volume, $A_A$ is accumulator piston area, $K_A$ is the accumulator spring coefficient, $P_A$ is accumulator pressure, $P_{pre}$ is pre-loaded accumulator spring pressure, and $V_{Amin}$ is the minimum accumulator volume.

Substituting the clutch and accumulator relationships into Equation 3 results in a target volume control duty cycle flow rate of:

$$Q_{DC} = \frac{3A_a^2}{4\mu_f K_a R_{eff} N_{4c} A_p}\left\{\frac{T_t^i - T_t^{i-1}}{\Delta t} + (I_1 + 4I_2 + I_3 + 16I_4 + 9I_5)\frac{\alpha_t - \alpha_{dt}}{\Delta t}\right\}$$

Figure 4:
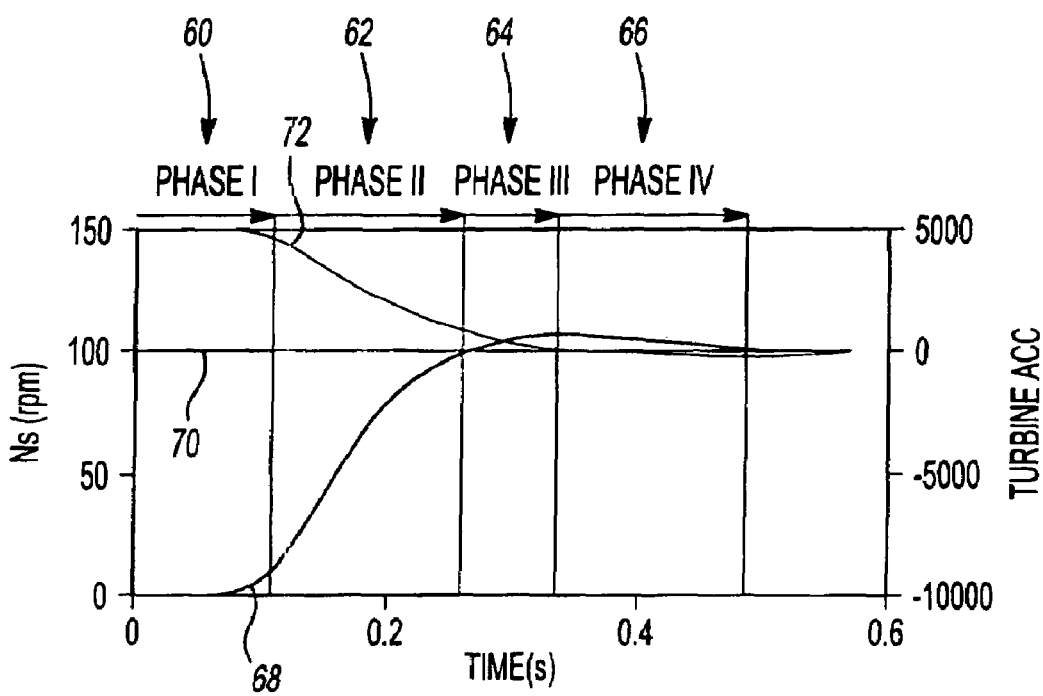
FIG. 4 illustrates a transmission kickdown control method according to the present invention.

Equation 3 is the required clutch torque during steady state conditions. Additionally, Equation 3 is the theoretical initial value for feedback controls. Using the above models, the present invention determines transmission kickdown control according to a release phase 60, a target volume control phase 62, an apply element fill phase 64, and an apply element control phase 66 as shown in FIG. 4. The transmission control as described relates to $N_i$, or current gear speed 68, $N_j$, or target gear speed 70, and $N_t$, or turbine speed 72. In the release phase 60, $T_{4C}$ is calculated according to equation 1. When the capacity of clutch 54 (as shown in FIG. 3) is less than the required torque, turbine speed will increase from its original gear speed $N_j$. The acceleration of the turbine speed depends on the input torque and the control torque in clutch 54:

$$(I_1+4I_2+I_3+16I_4+9I_5)\alpha_t = T_t - 3T_{UD} - 4T_{4C}.$$

At the beginning of the kickdown shift, clutch 54 is fast-released to the value of $V_{4C}$. The clutch 54 is reapplied when the tracking volume $V_{4C}$ reaches the calculated volume from Equation 5. Then, $V_{4C}$ is slowly ramped down until the turbine speed reaches a desired acceleration. Thereafter, the time $\tau$, which is a time allowed for the continuous and speed based desired acceleration control method to occur, is incremented for as long as $\alpha_d$ satisfies the condition:

$$\alpha_d < -\frac{T_t - 4(T_{4C})_{min}}{I_1 + 4I_2 + I_3 + 16I_4 + 9I_5}.$$

Otherwise, $\alpha_d$ is reduced in order to meet the above condition. During the release phase 60, the turbine speed begins to increase from the turbine speed 68 toward the target gear speed 70 as the turbine acceleration 72 decreases.

In the target volume control phase 62, turbine speed approaches and/or reaches desired initial turbine acceleration $$\alpha_d = \frac{N_j - N_i}{\tau}.$$

Actual target volume control activates according to a target gear turbine speed and desired acceleration $$\alpha_d = -\frac{N_j - N_i + \Delta N}{\tau_2(1 - e^{\frac{-\tau_1}{\tau_2}})}e^{\frac{-t}{\tau_2}}.$$

When $t > \tau_1 - t_f$, where $t_f$ is the required apply element fast fill clutch volume time, the apply element clutch begins to fill. As shown in FIG. 4, the turbine acceleration 72 decreases as the turbine speed 68 approaches the target gear speed 70.

In the apply element fill phase 64, $DC_t$ is applied to the apply element clutch after $N_t > N_j$. In other words, as the turbine speed 68 surpasses the target gear speed 70, torque is applied to the apply element clutch. In a 4-3 kickdown shift, the apply element clutch 48 pressure is:

$$P_{UD} = \frac{1}{3A_p \mu_f R_{eff} n_{UD}} [T_t - 4T_{4C} - (I_1 - 2I_2 + I_3 + 4I_4 + 3I_5)\alpha_O],$$

where $P_{UD}$ is the apply element clutch 48 pressure. The targeted volume to achieve this pressure is $$V_{UD} = \frac{A_{UDA}}{K_S} (P_{UD} A_{UDA} - P_{RE}),$$

where $V_{UD}$ is the targeted volume, A is accumulator piston area, $K_S$ is spring stiffness, and $P_{RE}$ is pre-loaded accumulator spring pressure.

In the apply element control phase 66, as soon as the turbine speed 68 begins to exhibit a negative slope, the release element is fast-vented in order to rapidly dump the pressure to the release element. Engine torque management may be required while the apply element quickly ramps to its full pressure. In this manner, the release element is fully released and the apply element is fully applied, completing the gear change.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for effecting a kickdown shift in a transmission of an automotive vehicle, the transmission including a plurality of gears and a torque converter assembly and turbine for transmitting torque between an engine and the plurality of gears through a plurality of engaging and releasing elements, the method comprising:
   determining an initial speed of the turbine;
   determining a target speed of one of the plurality of gears;
   determining a desired time required to increase the initial speed to the target speed;
   calculating a desired acceleration of the turbine according to the initial speed, the target speed, and the desired time; and
   controlling the torque of one or more releasing and engaging elements based on the desired acceleration.

2. The method of claim 1 wherein the step of calculating the desired acceleration includes calculating the desired acceleration according to a sum of the target speed and an offset speed.

3. The method of claim 2 further comprising applying an engagement element to said one of the plurality of gears when the turbine speed is approximately equal to the sum of the target speed and the offset speed.

4. The method of claim 1 wherein the target speed is determined in accordance with a shift event and a target gear ratio.

5. The method of claim 4 wherein the shift event is determined as a function of vehicle speed and one of throttle position and engine output torque.

6. The method of claim 1 wherein calculating the desired acceleration includes calculating the desired acceleration according to an exponential decay rate.

7. The method of claim 1 wherein controlling torque includes controlling the speed of the turbine according to the desired acceleration.

8. The method of claim 1 further comprising applying an engagement element to said one of the plurality of gears when the turbine speed exceeds the target speed.

9. A method for effecting a kickdown shift in a transmission of an automotive vehicle, the transmission including a plurality of gears and a torque converter assembly having a turbine for transmitting torque between an engine and the plurality of gears through a plurality of releasing and engagement elements, the method comprising:
   determining a shift event based on vehicle speed and one of a throttle position and engine output torque;
   determining an initial speed of the turbine;
   determining a target speed of one of the plurality of gears according to the shift event;
   determining a desired time required to increase the initial speed to the target speed;
   calculating a desired acceleration of the turbine according to the initial speed, the target speed, and the desired time; and
   controlling torque of one or more releasing and engaging elements based on the desired acceleration.

10. A system for effecting a kickdown shift in a transmission of an automotive vehicle, the transmission including a plurality of gears and a torque converter assembly and turbine for transmitting torque between an engine and the plurality of gears through a plurality of releasing and engagement elements, the system comprising:
    a transmission controller adapted to be coupled to the transmission;
    a turbine speed sensor transmitting a signal indicative of turbine speed to the transmission controller; and
    a transmission output speed sensor transmitting a signal indicative of transmission output speed to the transmission controller;
    wherein the transmission controller is operative:
    to determine, using the speed sensors, an initial speed of the turbine, a target speed of one of the plurality of gears, and a desired time required to increase the initial speed to the target speed;
    to calculate a desired acceleration of the turbine as a function of the initial speed, the target speed and the desired time; and
    to control turbine speed change rate based on the desired acceleration through controlling the torque of one or more releasing and engaging elements.

11. The system of claim 10 wherein the transmission controller is operative to calculate the desired acceleration according to a sum of the target speed and an offset speed.

12. The system of claim 11 wherein the transmission controller is further operative to apply an engagement element to said one of the plurality of gears when the turbine speed is approximately equal to the sum of the target speed and the offset speed.

13. The system of claim 10 wherein the transmission controller determines the target speed in accordance with a shift event and a target gear ratio.

14. The system of claim 13 further comprising a throttle position sensor or pedal position sensor and wherein the transmission controller determines the shift event as a function of vehicle speed and one of throttle positions, pedal position, and engine output torque.

15. The system of claim 10 wherein the transmission controller calculates the desired acceleration according to an exponential decay rate.

16. The system of claim 10 wherein the transmission controller controls the turbine speed change rate by controlling the clutch torque of one or more releasing and engaging elements according to the desired acceleration.

17. The system of claim 10 wherein the transmission controller is further operative to apply an engagement element to said one of the plurality of gears when the turbine speed exceeds the target speed.

18. A vehicle comprising:

an engine;

a transmission including a plurality of gears;

a torque converter assembly having a turbine for transmitting torque between the engine and the plurality of gears via a plurality of releasing and engaging elements; and a transmission controller coupled to the transmission and the engine, wherein the transmission controller is operative to:

determine an initial speed of the turbine;

determine a target speed of one of the plurality of gears;

determine a desired time required to increase the initial speed to the target speed;

calculate a desired acceleration of the turbine as a function of the initial speed, the target speed and the desired time; and control turbine speed change rate through controlling torque of one or more releasing and engaging elements based on the desired acceleration.

* * * * *